J. L. NORDNES.
FENDER FOR MOTOR VEHICLES.
APPLICATION FILED JUNE 23, 1921.
1,407,881. Patented Feb. 28, 1922.
Fig. 1.
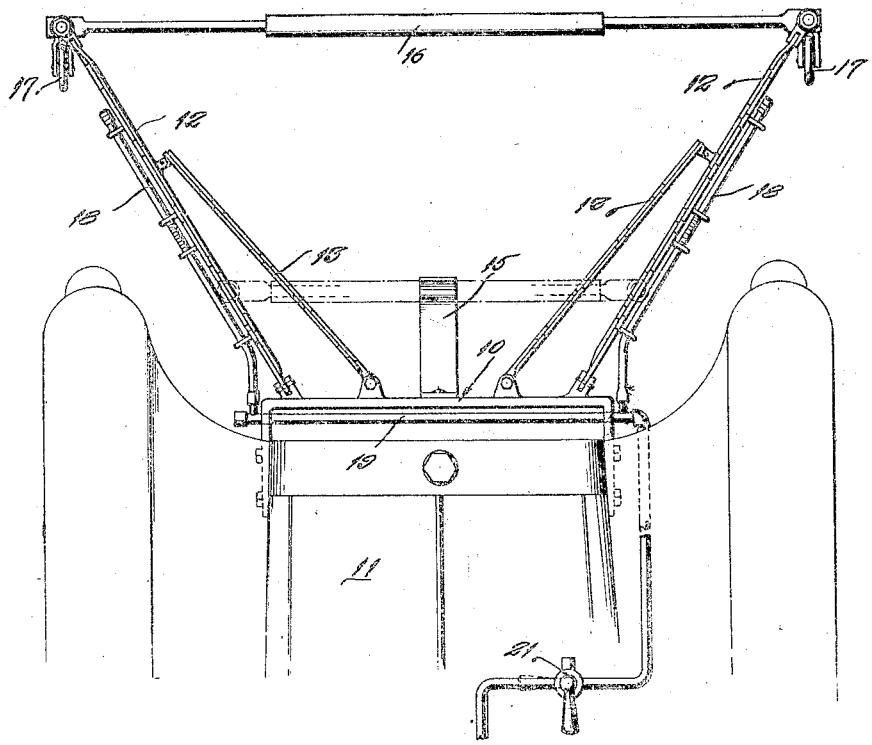
Fig. 3.
Fig. 2.
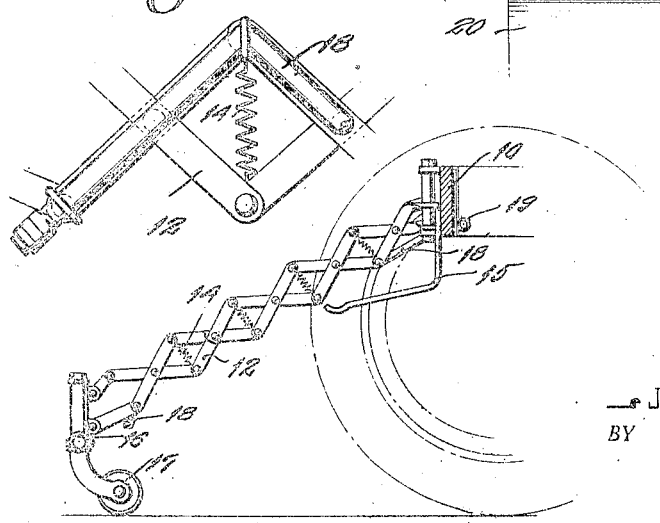
INVENTOR.
John L Nordnes
BY
ATTORNEYS.

UNITED STATES PATENT OFFICE.

JOHN LEONARD NORDNES, OF WAUKESHA, WISCONSIN.

FENDER FOR MOTOR VEHICLES.

1,407,881.  Specification of Letters Patent.  Patented Feb. 28, 1922.

Application filed June 23, 1921. Serial No. 479,773.

*To all whom it may concern:*

Be it known that I, JOHN LEONARD NORDNES, a citizen of the United States, and resident of Waukesha, in the county of Waukesha and State of Wisconsin, have invented certain new and useful Improvements in Fenders for Motor Vehicles; and I do hereby declare that the following is a full, clear, and exact description thereof.

My invention relates to improvements in fenders for motor vehicles, the principal object thereof being to provide a fender which is extensible whereby it may be projected well away from the vehicle when the latter is in danger of striking a person, other vehicle or obstruction, in order to reduce the harm done incident to an actual collision.

In producing my improvements it has been my further purpose to provide a strong and durable structure capable of quick and easy projection and retraction; to provide means normally holding said structure in retracted position in close juxtaposition to the vehicle; to provide other means of a simple and novel nature for projecting the structure in a unitary arrangement capable of being readily attached to and removed from a vehicle without the necessity of any material alterations thereto.

My invention is capable of embodiment in a variety of mechanical structures, one of which is shown in the accompanying drawings, but it is to be understood that the structure illustrated is merely intended as a disclosure of the essential characteristics of my invention in a preferred form and that its scope is as defined in the appended claims.

In the drawings, wherein like characters of reference denote corresponding parts in the different views:—

Figure 1 is a top plan of the forward portion of a vehicle showing my improved fender attached thereto in full line projected position and in dotted line retracted position.

Figure 2, a central longitudinal section on the line 2—2 of Figure 1, and

Figure 3, an enlarged elevation of a portion of one of the projectable and retractable arms.

Referring now to the drawings in detail, the numeral 10 designates a substantially U-shaped bar providing a carrier and supporting member for the fender structure proper hereinafter more particularly referred to, the arms of said bar providing means whereby it and the fender structure carried thereby may be readily secured by means of bolts or other fasteners to the frame of a vehicle 11 as clearly illustrated in Figure 1 of the drawings.

The inner ends of a pair of outwardly diverging lazy tong arms 12 are suitably connected to the bar 10 adjacent to the respective ends thereof in such a manner that said arms may be readily projected and retracted. Another pair of lazy tong arms 13, somewhat shorter than the arms 12, are connected at their inner ends to the bar 10 and at their outer ends to the respective arms 12 for the purpose of bracing the latter arms when they are in extended position.

Means in the nature of contractile coil springs 14 connected at their respective ends to the links forming the lazy tong arms 12, preferably at the points of pivotal connection of said links with one another, has been provided to normally exert an influence tending to project said arms. The latter, after being manually retracted, however, are normally held in close juxtaposition to the vehicle by a member 15 including a yieldable arm secured to the bar 10 and having a hooked extremity adapted to engage a bumper rod 16 which connects the outer ends of said arms 12, and as clearly shown in Figure 1. Desirably, the rod 16 is formed of telescoping sections so that the divergent arrangement of the arms 12 will in no way hinder their projection and retraction, and the rod 16 is further provided at each end with swiveled rollers 17 for engagement with the road to relieve the structure of any strains due to its weight when in projected position.

In combination with the structure thus far described, I may provide means to release the retaining member 15 and rely upon the springs 14 to project the arms and bumper rod when an emergency arises, but I prefer to utilize positive means to accomplish this purpose, such positive means consisting of a pair of flexible tubes 18 secured at spaced intervals to the respective arms 12. These tubes are closed at their outer ends and at their inner ends are connected to a pipe 19 leading from a fluid pressure tank 20 carried by the vehicle. A valve 21, preferably located in convenient reach of the operator of the vehicle, provides a means whereby the fluid under pressure in said tank may be admitted to the flexible tubes 18, which admission of fluid pressure, as is well known, will tend to straighten out the flexible tubes and thereby result in the arms 12 and the parts connected therewith being projected outwardly as desired. It being understood that the member 15 is sufficiently rigid to normally maintain the arms 12 retracted but that it is sufficiently flexible to release the fender under the influence of pressure in the tubes 18. The valve 21 may be a two way valve so that the air may be exhausted from the tubes when the emergency has passed, when the whole structure may be manually retracted and engaged with the retaining member 15 ready to be projected when an emergency again presents itself.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. A vehicle fender including a supporting member adapted to be secured to the vehicle, projectable and retractable arms carried by said member, a bumper rod carried by said arms, projectable and retractable braces between said arms and said supporting member, and means for projecting said arms.

2. A vehicle fender including a pair of lazy tong arms, a bumper rod connecting said arms, flexible tubes secured to said arms, and means whereby said tubes may be supplied with fluid under pressure to effect projection of said arms.

3. A vehicle fender including a supporting member adapted to be secured to the vehicle, projectable and retractable arms carried by and extending at angles to said member, a bumper rod composed of telescoping sections carried at the outer ends of said arms, and means for projecting the latter.

In testimony that I claim the foregoing I have hereunto set my hand at Waukesha, in the county of Waukesha and State of Wisconsin.

JOHN LEONARD NORDNES.